United States Patent [19]
Felix et al.

[11] Patent Number: 4,775,998
[45] Date of Patent: Oct. 4, 1988

[54] CELLULAR RADIOTELEPHONE SYSTEM HAVING COLOCATED BASE SITES

[75] Inventors: Kenneth A. Felix, Crystal Lake; Dennis R. Schaeffer, Buffalo Grove; Jeffrey D. Bonta, Arlington Heights, all of Ill.

[73] Assignee: Motorola, Inc., Schaumburg, Ill.

[21] Appl. No.: 75,913

[22] Filed: Jul. 20, 1987

[51] Int. Cl.[4] .................................. H04M 11/00
[52] U.S. Cl. ................................ 379/59; 379/60
[58] Field of Search ............... 455/33, 32, 54, 56, 455/58; 379/60, 63, 59

[56] References Cited

U.S. PATENT DOCUMENTS

| | | | |
|---|---|---|---|
| 3,906,166 | 9/1975 | Cooper et al. | 379/60 |
| 4,144,411 | 3/1979 | Frenkiel | 279/60 |
| 4,268,722 | 5/1981 | Little et al. | 379/60 |
| 4,485,486 | 11/1984 | Webb et al. | 455/33 |
| 4,528,656 | 7/1985 | Morais | 370/30 |
| 4,669,107 | 5/1987 | Eriksson-Lennartsson | 379/60 |
| 4,680,786 | 7/1987 | Baker et al. | 379/60 |
| 4,698,839 | 10/1987 | DeVaney et al. | 379/60 |
| 4,723,266 | 2/1988 | Perry | 379/60 |
| 4,727,590 | 2/1988 | Kawano | 455/33 |
| 4,730,310 | 3/1988 | Acampora et al. | 370/95 |
| 4,737,978 | 4/1988 | Burke et al. | 379/60 |
| 4,750,198 | 6/1988 | Harper | 379/59 |

*Primary Examiner*—Robert Lev
*Attorney, Agent, or Firm*—Rolland R. Hackbart

[57] ABSTRACT

A cellular radiotelephone system (101) includes a control terminal (420) coupled by in trunks and out trunks to the telephone central office (110) and by data and voice lines to base sites (411–416) in corresponding cells (401–406) for providing telephone coverage to mobiles located throughout a geographical area. In order accommodate additional voice channels in each cell (401–405), base sites (441–446) are colocated with corresponding existing base sites (401–405). Paging/access channels are assigned to existing base sites (411–416) for paging mobiles for all outgoing originations and processing all incoming mobile originations and page responses. Access-only channels are assigned to colocated base sites (441–446) for processing mobile originations and page responses transferred thereto by a directed retry message from corresponding existing base sites (401–405). The additional voice channels assigned to colocated base sites (441–446) may be voice channels in new radio frequency bands allocated to cellular radiotelephone systems. If both existing and additional voice channels are assigned to existing base sites (411–416) and/or colocated base sites (441–446), new voice channels are assigned to requesting mobiles before assigning existing voice channels, provided that the requesting mobile operates on both existing and new voice channels.

24 Claims, 9 Drawing Sheets

CELLULAR RADIOTELEPHONE SYSTEM HAVING COLOCATED BASE SITES

BACKGROUND OF THE INVENTION

The present invention generally relates to radiotelephone communication systems and more specifically to a method and apparatus for assigning voice channels in cellular radiotelephone systems having colocated base sites.

Mobile radiotelephone service has been in use for some time and traditionally has been characterized by a central site transmitting by way of high-power transmitters to a limited number of mobile or portable radiotelephones in a large geographic area. To avoid repetition, the word "mobile" will be used hereinafter to mean mobile and/or portable radiotelephones. Mobile transmissions, due to their lower power transmitters, were generally received in previous systems by a network of satellite receivers remotely located from the central site for receiving and relaying mobile transmissions to the central site for processing. In previous systems only a limited number of radio channels were available, thus limiting the number of radiotelephone conversations in an entire city to the specific number of available channels.

Modern cellular radiotelephone systems have a comparatively large number of radio channels available which, further, can be effectively multiplied by reuse of the radio channels in a geographical area, such as the metropolitan area of a large city like Chicago or New York, by dividing the radio coverage area into smaller coverage areas called "cells" using low power transmitters and coverage restricted receivers. Such cellular systems are further described in U.S. Pat. Nos. 3,906,166 and 4,268,722. The limited coverage area enables the radio channels used in one cell to be reused in another cell geographically separated according to a predetermined plan, such as a four cell pattern shown and described in U.S. Pat. No. 4,128,740. In this four cell pattern, each cell is assigned a subset of the available radio channels and reuse of the radio channels is accomplished by repeating the pattern throughout a geographical area.

A cellular system typically utilizes a pair of radio frequencies for each radio channel in each cell. Each cell is assigned at least one paging/access channel and several voice channels. The paging/access channel is dedicated to controlling the operation of the mobiles by means of data messages transmitted to and received from the mobiles. Control functions performed include paging selected mobiles, receiving requests for service from mobiles, instructing mobiles to tune to a voice channel where a conversation may take place, identifying the particular system to the mobiles, and enabling mobile registration by which process the mobiles identify themselves to the system. The data message and radio channel specifications for U.S. cellular radiotelephone systems are set forth in Electronic Industries Association (EIA) Interim Standard IS-3 implemented in accordance with 47 CFR 22 and the Report and Orders pertaining to Federal Communications Commission Docket 79-318. Copies of EIA Interim Standard IS-3 may be obtained from the Engineering Department of the Electronic Industries Association at 2001 Eye Street, N.W., Washington, D.C. U.S.A. 20006.

A cellular system can grow by adding more voice channels to existing cells, subdividing existing cells into smaller cells and adding new cells. The least costly and therefor preferable way to grow is to add voice channels to existing cells. However, the number of voice channels that may be added is limited to the maximum number of voice channels which conventional cell site equipment can accommodate. Since some of the additional voice channels may be in new radio frequency bands accessible only to some of the mobiles, the process of assigning a voice channel to a mobile must take into account whether or not the available voice channel can be accessed by that mobile. Accordingly, there is a need for an improved method and apparatus for accommodating and assigning additional voice channels in existing cells of cellular systems without subdividing existing cells or adding new cells.

SUMMARY OF THE INVENTION

Therefore, it is an object of the present invention to provide an improved method and apparatus for assigning voice radio channels in cellular systems having expanded radio frequency bands accessible only to some of the mobiles.

It is a further object of the present invention to provide an improved method and apparatus for redirecting mobiles to colocated base sites in order to accommodate additional voice channels in existing cells of cellular systems.

Briefly described, the present invention encompasses an improved method of assigning voice radio channels for radiotelephone calls in a cellular radiotelephone system providing telephone service to radiotelephones located in a geographical area. The geographical area is divided into a plurality of cells each assigned at least one paging/access radio channel and a first plurality of voice radio channels which differ from those assigned to adjoining cells. Each cell further includes fixed site radio apparatus for communicating with said radiotelephones. The novel method comprises the steps of: assigning a second plurality of voice radio channels to at least one cell which differ from the first plurality of voice radio channels of all cells; operating a first group of radiotelephones on the first plurality of voice radio channels of all cells; operating a second group of radiotelephones on the first plurality of voice radio channels of all cells and the second plurality of voice radio channels of said one cell; for a radiotelephone call in each cell with a radiotelephone in the first group of radiotelephones, assigning a voice radio channel from the first plurality of voice radio channels for the cell; and for a radiotelephone call in said one cell with a radiotelephone in the second group of radiotelephones, assigning one of the second plurality of voice radio channels for the cell before assigning one of the first plurality of voice radio channels for the cell.

DETAILED DESCRIPTION OF THE PREFERRED EMBODIMENT

Figure 1:
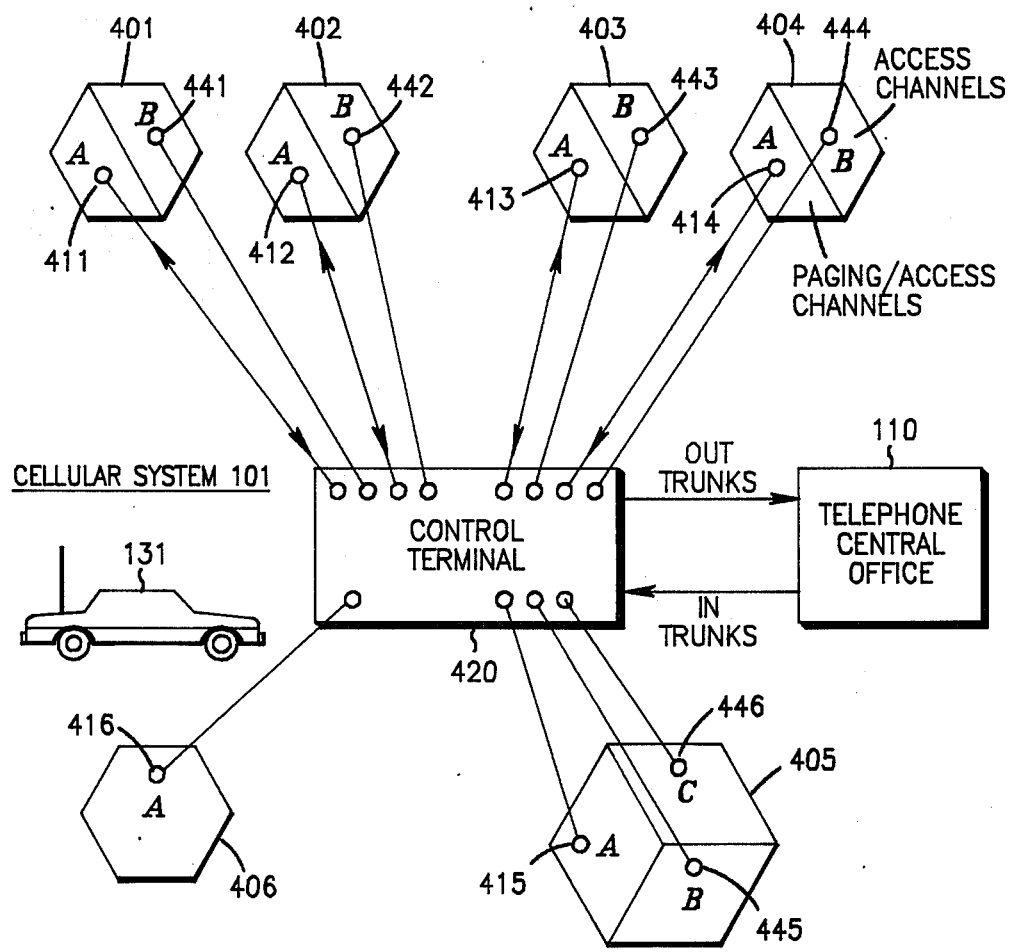
FIG. 1 is a block diagram of a cellular radiotelephone system including colocated base sites which may advantageously utilize the present invention.

In FIG. 1, there is illustrated a cellular system 101 covering a geographical area, such as the metropolitan area of a large city. Each element of cellular system 101 may be the corresponding element of conventional cellular system currently commercially available from a number of different manufacturers. Cellular system 101 includes control terminal 420 coupled by in and out trunks (conventional telephone trunks) coupled to central office 110 and by data and voice lines to existing base sites 411–416 in cells 401–406, respectively, for providing telephone service to mobiles 131 in its geographical area. Cellular system 101 may grow by adding more voice channels to existing cells 401–406, subdividing existing cells 401–406 into smaller cells, and/or adding new cells. Adding additional voice channels to existing cells 401–406 is preferable since it it least costly and service interruptions may be either avoided or minimized. However, adding voice channels is limited by the maximum number of voice channels which existing base sites 411–416 can accommodate. Thereafter, further growth is possible only by subdividing existing cells or adding new cells, both of which incur substantial costs in terms of money and cellular service interruptions.

However, by utilizing the present invention, voice channels may be added to existing cells 401–405 of cellular system 101 by locating base sites 441–445 with corresponding base sites 411–415 in each cell. That is, for example, base site 411 may be colocated with base site 441 in cell 401. Both base site 411 and base site 441 cover the area of cell 401. Moreover, if even further voice channels are needed in a cell such as cell 405, a third base site 446 may be colocated with base sites 415 and 445. New cells may be added to cellular system 101 by adding a new base site which may include a single base site like cell 406 or colocated base sites like cells 401–405 to meet expected radiotelephone traffic demands.

Voice channels which are added to a cell may be radio channels (TACS channels) in the existing radio frequency band allocated to cellular system 101 or may be new radio channels (ETACS channels) in new radio frequency bands allocated to all cellular systems in order to accommodate increasing radiotelephone traffic demands. In the United Kingdom, the ETACS channels are radio channels located at frequencies above the frequencies of existing TACS channels. In the United States, the additional radio channels analogous to ETACS channels may be radio channels having frequencies located above and/or below the frequencies of existing radio channels. In the preferred embodiment of the present invention, base sites 411–416 are assigned TACS channels and base sites 441–446 are assigned ETACS channels. In other embodiments of the present invention, one or both of base sites 411–416 and base sites 441–446 may be assigned both TACS channels and ETACS channels.

According to a feature of the present invention, base sites 411–415 may be coupled by data lines to corresponding colocated base sites 441–446 or may interact by using directed retry messages to direct mobiles requesting a voice channel from one to another. Use of directed retry messages is less costly and minimizes service interruptions, since it requires no hardware changes at existing base sites 411–415.

As previously explained, each cell is assigned at least one paging/access channel and several voice channels. In U.S. cellular systems, twenty-one channels have been reserved for paging/access channels. For cellular system 101 in FIG. 1, nine paging/access channels may be assigned to base sites 411–416 (leaving twelve paging/access channels unused) where a nine cell pattern of channel reuse is adopted (see U.S. Pat. No. 4,128,740 for an explanation of reuse of channels in cellular systems). Mobiles identify the paging/access channels by reading the overhead message train (described in detail in EIA Interim Standard IS-3) received from the strongest of the twenty-one paging/access channels.

According to the present invention, the assignment of paging/access channels in cellular system 101 in FIG. 1 is further characterized in that, nine paging/access channels are assigned to to base sites 411–416, and nine access-only channels are assigned to base sites 441–446. The access-only channels for base sites 441–446 are preferably located outside of the group of twenty-one channels reserved for paging/access channels. Furthermore, if additional paging capacity is needed in a cell, a base site 441–446 may be assigned a paging/access channel. As a result, all mobile originations and page responses are made to base sites 411–416. In the preferred embodiment of the present invention, base sites 411–415 process all TACS and ETACS mobile originations and page responses, and transfer all ETACS mobile originations and page responses to base sites 441–446 by sending a directed retry message to the mobile. Upon receipt of the directed retry message, the ETACS mobile scans and selects one of the nine access-only channels of base sites 441–446. As a result of this unique operating mode of cellular system 101, all mobile originations and page responses in a cell are processed by base sites 411–416 and ETACS mobile originations and page responses are directed to base sites 441–446 for processing. If no ETACS channels are available at base sites 441–446, ETACS , mobile originations and page responses are directed back to base sites 411–416 for assignment of an available TACS channel.

In other embodiments of the present invention, base sites 411–415 process each TACS and ETACS mobile origination and page response, and, if no TACS or ETACS voice channels are available or on the basis of other criteria, transfer the mobile origination or page response to base sites 441–446 by sending a directed retry message to the mobile. Even though voice channels are available, base sites 411–415 may transfer a percentage of such mobile originations or page responses to base sites 441–446 in order to provide a desired voice channel load that may be dynamically varied depending on parameters selected by the system operator and the actual voice channel load in each cell.

Upon receipt of the directed retry message, the mobile scans and selects one of the nine access-only channels of base sites 441-446. As a result of this unique operating mode of cellular system 101, all mobile originations and page responses in a cell are processed by base sites 411-416 and the voice channel load may be split between base sites 411-415 and base sites 441-446.

Figure 5:
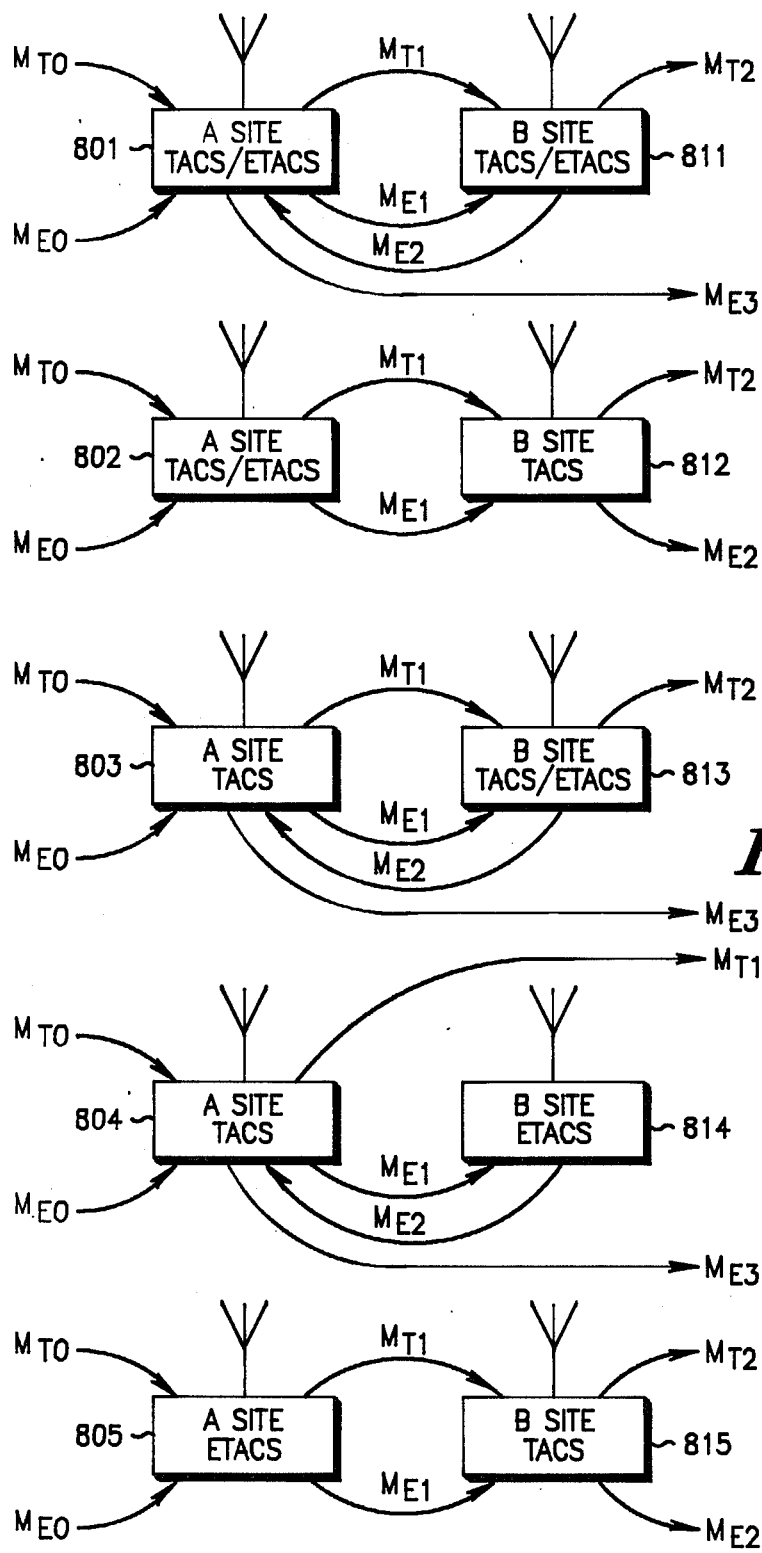
FIG. 5 is a series of state diagrams showing TACS and ETACS mobiles directed between colocated base sites in five different cells.

Referring next to FIG. 5, there is illustrated a series of state diagrams showing TACS and ETACS mobiles directed between colocated base sites 801-805 and 811-815, respectively, in five different cells. A-sites 801-805 are each assigned a paging/access channel, and B-sites 801-805 are each assigned an access-only channel. If additional paging capacity is needed in a cell, a B-site 811-815 may be assigned a paging/access channel. When a TACS or ETACS mobile is first turned on, all twenty-one possible paging/access channels are scanned and the strongest is selected. The overhead message train transmitted on the selected paging/access channel is read and used to obtain the channel numbers of the other paging channels, which will be the paging-/access channels of A-sites 801-805. The mobile then scans the paging channels, selects the strongest paging channel and reads the overhead message thereon. The overhead message on the strongest paging channel is used to obtain the channel numbers of the access channels, which again will be the paging/access channels of A-sites 801-805. Thus, for originations and page responses, mobiles will use the strongest paging/access channel which will be one of the paging/access channels of A-sites 801-805.

In the first illustrated cell in FIG. 5, colocated base sites 801 and 811 operate on both TACS and ETACS channels. A TACS mobile designated $M_{T0}$ requests a TACS voice channel initially from A-site 801. If a TACS channel is not available at A-site 801, the TACS mobile designated $M_{T1}$ is directed to B-site 811. If a TACS channel is not available at B-site 811, the TACS mobile designated $M_{T2}$ is directed to adjacent base sites. An ETACS mobile designated $M_{E0}$ requests a TACS or ETACS voice channel initially from A-site 801. The ETACS mobile designated $M_{E1}$ is directed to B-site 811, and the channel list at A-site 801 is updated to indicate that the ETACS mobile was redirected. If a TACS or ETACS channel is not available at B-site 811, the ETACS mobile designated $M_{E2}$ is directed back to A-site 801. If a TACS or ETACS channel is not available at A-site 801, the ETACS mobile designated $M_{E3}$ is directed to adjacent base sites.

In the second illustrated cell in FIG. 5, base site 802 operates on both TACS and ETACS channels, and colocated base site 812 operates on TACS channels. A TACS mobile designated $M_{T0}$ requests a TACS voice channel initially from A-site 802. If a TACS channel is not available at A-site 802, the TACS mobile designated $M_{T1}$ is directed to B-site 812. If a TACS channel is not available at B-site 812, the TACS mobile designated $M_{T2}$ is directed to adjacent base sites. An ETACS mobile designated $M_{E0}$ requests a TACS or ETACS voice channel initially from A-site 802. If a TACS or ETACS channel is not available at A-site 801, the ETACS mobile designated $M_{E1}$ is directed to B-site 811. If a TACS channel is not available at B-site 811, the ETACS mobile designated $M_{E2}$ is directed to adjacent base sites.

In the third illustrated cell in FIG. 5, base site 803 operates on TACS channels, and colocated base site 813 operates on both TACS and ETACS channels. A TACS mobile designated $M_{T0}$ requests a TACS voice channel initially from A-site 803. If a TACS channel is not available at A-site 803, the TACS mobile designated $M_{T1}$ is directed to B-site 813. If a TACS channel is not available at B-site 813, the TACS mobile designated $M_{T2}$ is directed to adjacent base sites. An ETACS mobile designated $M_{E0}$ requests a TACS or ETACS voice channel initially from A-site 803. The ETACS mobile designated $M_{E1}$ is directed to B-site 813, and the channel list at A-site 803 is updated to indicate that the ETACS mobile was redirected. If a TACS or ETACS channel is not available at B-site 813, the ETACS mobile designated ME2 is directed back to A-site 803. If a TACS channel is not available at A-site 803, the ETACS mobile designated $M_{E3}$ is directed to adjacent base sites.

In the fourth illustrated cell in FIG. 5, base site 804 operates on TACS channels, and colocated base site 814 operates on ETACS channels. A TACS mobile designated $M_{T0}$ requests a TACS voice channel initially from A-site 804. If a TACS channel is not available at A-site 804, the TACS mobile designated $M_{T1}$ is directed to adjacent base sites. An ETACS mobile designated $M_{E0}$ requests a TACS or ETACS voice channel initially from A-site 804. The ETACS mobile designated $M_{E1}$ is directed to B-site 814, and the channel list at A-site 804 is updated to indicate that the ETACS mobile was redirected. If an ETACS channel is not available at B-site 814, the ETACS mobile designated $M_{E2}$ is directed back to A-site 804. If a TACS channel is not available at A-site 804, the ETACS mobile designated $M_{E3}$ is directed to adjacent base sites.

In the fifth illustrated cell in FIG. 5, base site 805 operates on ETACS channels, and colocated base site 815 operates on TACS channels. A TACS mobile designated $M_{T0}$ K requests a TACS voice channel initially from A-site 805. The TACS mobile designated $M_{T1}$ is directed to B-site 815. If a TACS channel is not available at B-site 815, the TACS mobile designated $M_{T2}$ is directed to adjacent base sites. An ETACS mobile designated $M_{E0}$ requests a TACS or ETACS voice channel initially from A-site 805. If an ETACS channel is not available at A-site 815, the ETACS mobile designated $M_{E1}$ is directed back to B-site 805. If a TACS channel is not available at B-site 805, the ETACS mobile designated $M_{E2}$ is directed to adjacent base sites.

Figure 6:
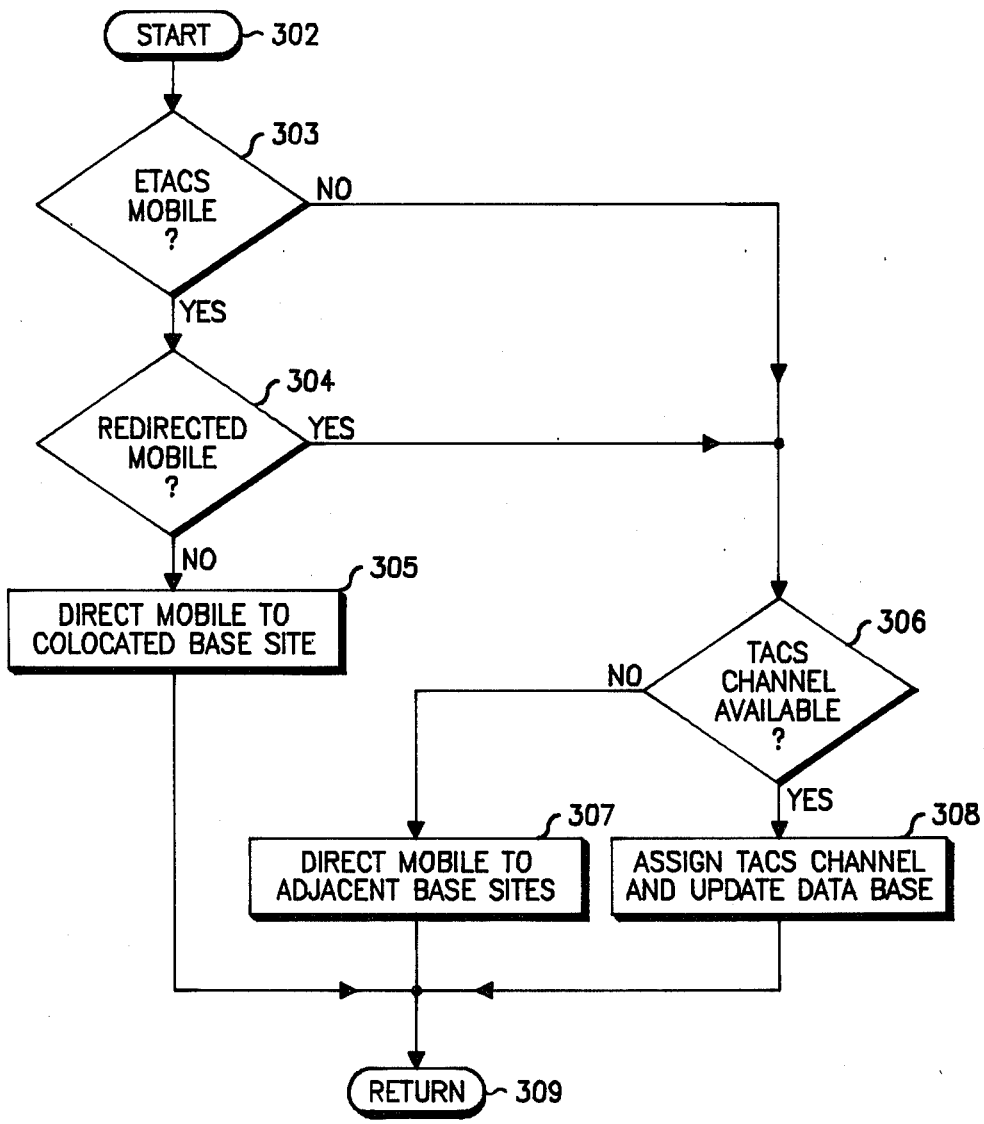
FIG. 6 is a flow diagram executed by the existing base sites in FIG. 1 for assigning voice radio channels.

Referring to FIG. 6, the channel assignment flow diagram for base sites 411-415 in FIG. 1 is entered at block 302 and proceeds to block 303 where a check is made to determine if a mobile requesting a voice channel assignment operates on ETACS channels. In the preferred embodiment of the present invention, base sites 411-416 operate on TACS channels, and base sites 441-446 operate on ETACS channels. The base sites 411-415 and 441-446 determine if the requesting mobile operates on ETACS channels by examining the bits of the station class field in the access or page response message from the mobile. If the requesting mobile does not operate on ETACS channels, NO branch is taken from decision block 303 to decision block 306. If the requesting mobile operates on ETACS channels, YES branch is taken from decision block 303 to decision block 304.

According to the present invention, ETACS mobiles are directed to colocated base sites 441-446 before assigning a TACS channel at base sites 411-415. At decision block 304, a check is made to determine if the mobile has been redirected back to base sites 411-415. Base sites 411-416 store information on each mobile access or page response in a data base, such information including the mobile identification, whether the mobile has been directed to a colocated base site 441–446 and other selected information. Thus, the data base of base sites 411–415 is checked to determine if the requesting mobile was previously directed to a colocated base site 441–446. If not, NO branch is taken to block 305 where a directed retry message is sent to the requesting mobile for directing it to the corresponding colocated base site 441–446. If there is no colocated corresponding base site as in cell 406, the requesting mobile is directed to the base sites of adjacent cells. Thereafter, program control returns to other tasks at block 309.

Returning again to decision block 304 in FIG. 6, if the requesting mobile was previously directed to the corresponding colocated base site 441–446, YES branch is taken to decision block 306, where the requesting mobile a check is made to determine if a TACS channel is available. If so, YES branch is taken to block 308 where an available TACS channel is assigned to the requesting mobile, and the channel list is updated to indicate such assignment. Thereafter, program control returns to other tasks at block 309. If a TACS channel is not available, NO branch is taken from decision block 306 to block 307 where where a directed retry message is sent to the requesting mobile for directing it to the base sites of adjacent cells. Thereafter, program control returns to other tasks at block 309.

Figure 7:
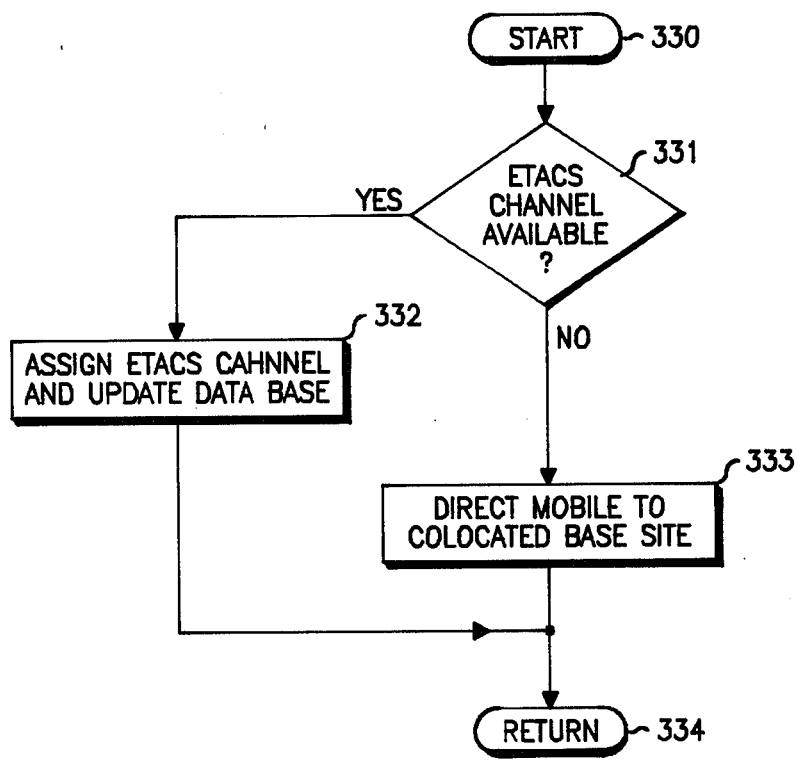
FIG. 7 is a flow diagram executed by the base sites colocated with the existing base sites in FIG. 1 for assigning voice radio channels.

Referring to FIG. 7, the channel assignment flow diagram for base sites 441–446 in FIG. 1 is entered at block 330 and proceeds to block 331 where a check is made to determine if ETACS channel is available at the base site. According to the present invention, ETACS channels are assigned to new mobiles before TACS channels since existing mobiles operate only on TACS channels and new mobiles operate on both TACS and ETACS channels. If an ETACS channel is available at the base site, YES branch is taken to block 332 where an available ETACS channel is assigned to the requesting mobile and the channel list is updated to indicate such assignment. Thereafter, program control returns to other tasks at block 334. If an ETACS channel is not available, NO branch is taken from decision block 352 to block 333, where the requesting mobile is directed back to the corresponding colocated base site 411–415 and the data base is updated to indicate same. Thereafter, program control returns to other tasks at block 334.

Figure 8:
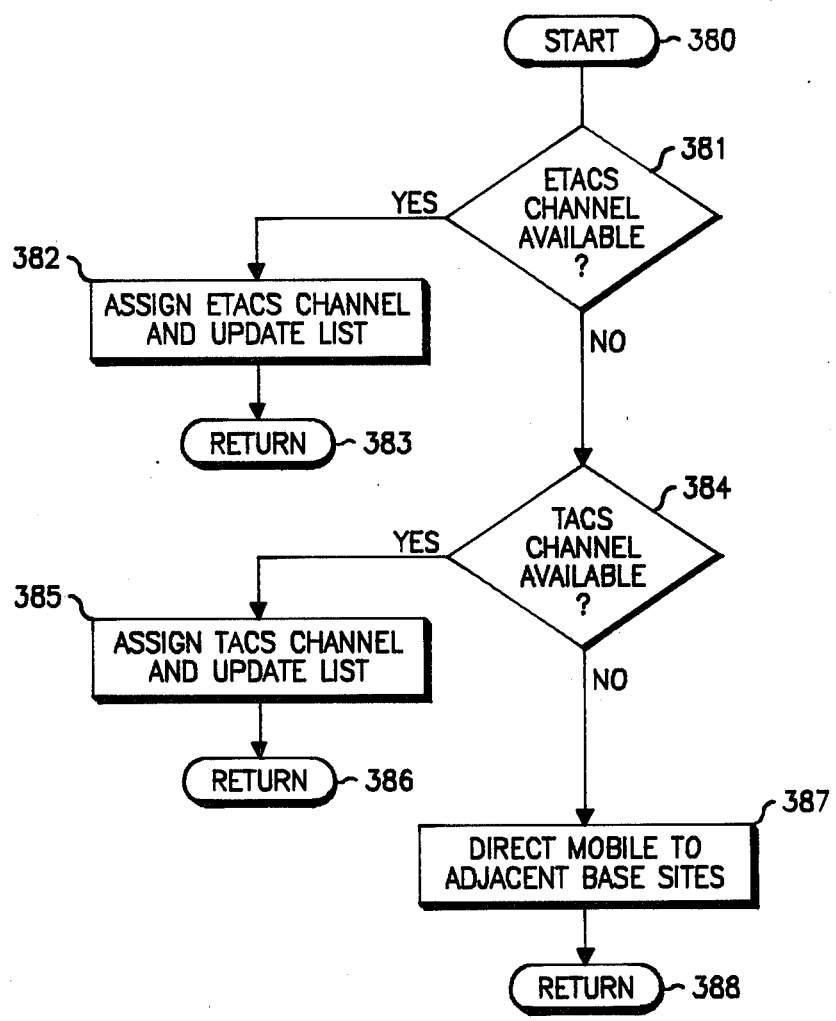
FIG. 8 is a flow diagram executed by the base sites in FIG. 1 for assigning TACS and ETACS voice radio channels in center-illuminated cell.

Referring to FIG. 8, there is illustrated a flow diagram of the channel assignment process for omnidirectional-illuminated base sites. For FIG. 8, it will be assumed that all mobiles and base sites can operate on both TACS and ETACS channels. Base sites 441–446 determine if the requesting mobile operates on ETACS channels by examining the bits of the station class field in the access or page response message from the mobile. If the requesting mobile does not operate on ETACS channels, NO branch is taken from decision block 350 to decision block 358. If the requesting mobile operates on ETACS channels, YES branch is taken to decision block 352.

According to the present invention, ETACS channels are assigned to mobiles before TACS channels since existing mobiles operate only on TACS channels and new mobiles operate on both TACS and ETACS channels. The flow diagram of FIG. 8 is entered at block 380 and proceeds to block 381 where a check is made to determine if an ETACS channel is available at the base site. If so, YES branch is taken to block 382 where an available ETACS channel is assigned to the requesting mobile and the channel list is updated to indicate such assignment. Thereafter, program control returns to other tasks at block 383. If an ETACS channel is not available, NO branch is taken from decision block 35 to decision block 384.

At decision block 384, a check is made to determine if a TACS channel is available. If so, YES branch is taken to block 385 where an available TACS channel is assigned to the requesting mobile and the channel list is updated to indicate such assignment. Thereafter, program control returns to other tasks at block 386. If a TACS channel is not available, NO branch is taken from decision block 384 to block 387, where the requesting mobile is directed back to adjacent base sites where a TACS or ETACS channel may be available. Thereafter, program control returns to other tasks at block 388.

Figure 9:
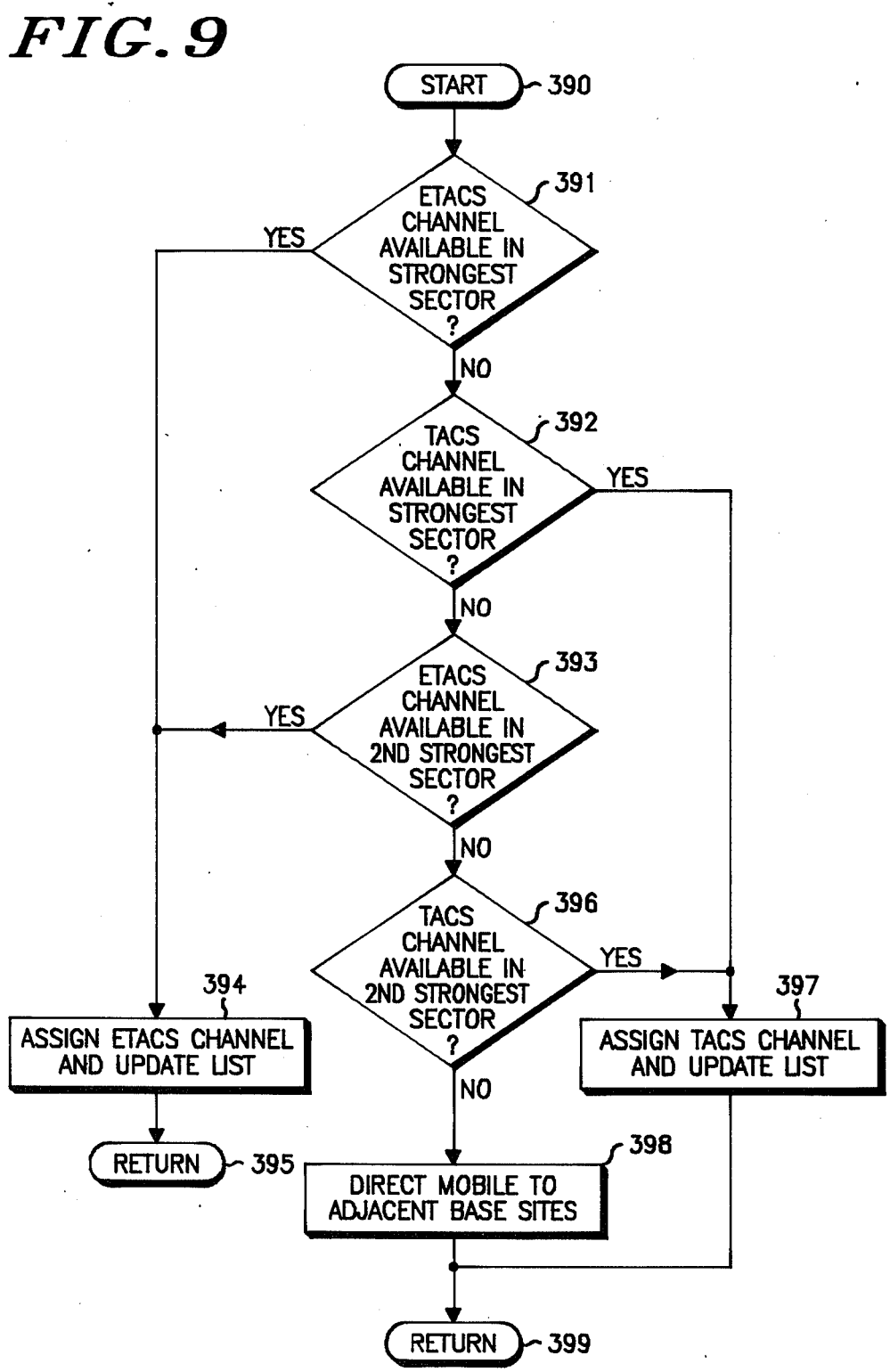
FIG. 9 is a flow diagram executed by the base sites in FIG. 1 for assigning TACS and ETACS voice radio channels in a sector-illuminated cell.

The flow diagram in FIG. 8 is for omnidirectional-illuminated cells. In the case of sector-illuminated cells, the flow diagram of FIG. 9 is executed. As in the description hereinabove for FIG. 8, it will be assumed that all mobiles and base sites can operate on both TACS and ETACS channels. Referring to FIG. 9, the channel assignment flow diagram for base sites of sector-illuminated cells is entered at block 390 and proceeds to block 391 where a check is made to determine if an ETACS channel is available in the strongest sector at the base site. If an ETACS channel is available, YES branch is taken to block 394 where an available ETACS channel is assigned to the requesting mobile and the channel list is updated to indicate such assignment. Thereafter, program control returns to other tasks at block 395.

Returning to decision block 391 in FIG. 9, if an ETACS channel is not available, NO branch is taken to decision block 392 where a check is made to determine if a TACS channel is available in the strongest sector at the base site. If so, YES branch is taken to block 397 where an available TACS channel is assigned to the requesting mobile and the channel list is updated to indicate such assignment. Thereafter, program control returns to other tasks at block 399. If a TACS channel is not available, NO branch is taken from decision block 392 to decision block 393 where a check is made to determine if an ETACS channel is available in the second strongest sector at the base site. If so, YES branch is taken to block 394 where an available TACS channel is assigned to the requesting mobile and the channel list is updated to indicate such assignment. Thereafter, program control returns to other tasks at block 395.

Returning to decision block 393 in FIG. 9, if an ETACS channel is not available, NO branch is taken to decision block 396 where a check is made to determine if a TACS channel is available in the second strongest sector at the base site. If so, YES branch is taken to block 397 where an available TACS channel is assigned to the requesting mobile and the channel list is updated to indicate such assignment. Thereafter, program control returns to other tasks at block 399. If a TACS channel is not available in the second strongest sector at the base site, NO branch is taken from decision block 396 to block 398 where the requesting mobile is directed to adjacent base sites where a TACS or ETACS channel may be available. Thereafter, program control returns to other tasks at block 399.

Figure 2:
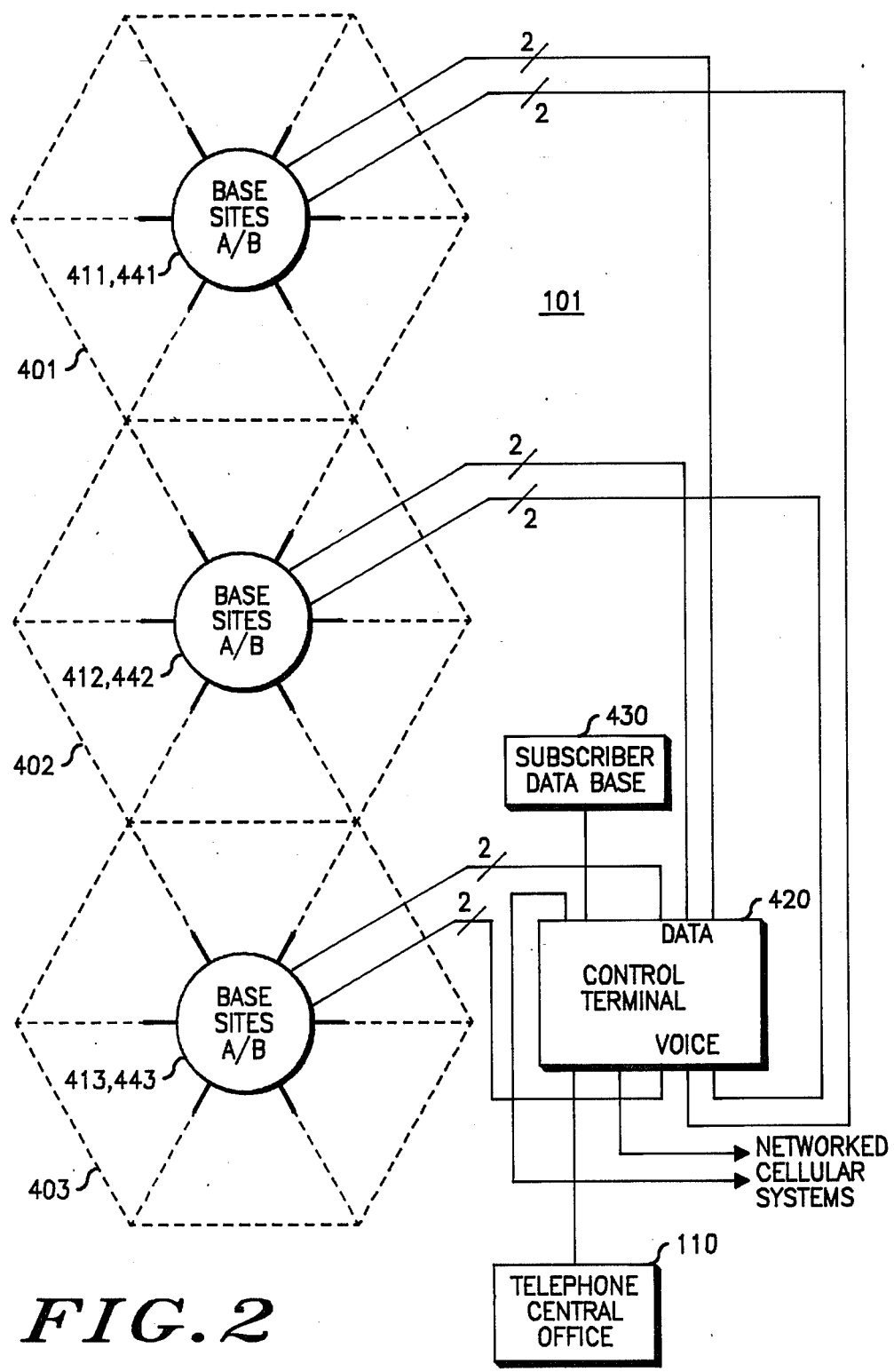
FIG. 2 is a block diagram of the equipment which would be employed in a conventional center-illuminated sector cellular system.

Referring now to FIG. 2, there is illustrated a block diagram of cellular system 101 in FIG. 1. Such cellular system 101 is further described in U.S. Pat. Nos. 3,906,166 and 4,268,722 each assigned to the assignee of the present invention and incorporated herein by reference and in an experimental cellular radiotelephone system application filed under FCC Docket No. 18262 with the Federal Communications Commission by Motorola and American Radio-Telephone Service, Inc., in Feb. 1977. Such cellular systems provide telephone coverage to mobiles located throughout a large geographical area, such as the metropolitan area of one or more large cities. Mobiles may be cellular radiotelephones of the type described in U.S. Pat. Nos. 4,486,624, 3,962,553 and 3,906,166 each assigned to the assignee of the present invention and incorporated herein by reference, and in Motorola instruction manual number 68P81039 E25, published by Motorola Service Publications, Schaumburg, Ill., in 1979. Mobiles are commercially available in the U.S. from a number of cellular radiotelephone suppliers. Although FIG. 2 shows three center-illuminated sector cells, it is obvious that a person skilled in the art may be able to apply the essence of the present invention to other types of cellular configurations such as, for example, omnidirectional-illuminated or corner-illuminated cellular configurations.

As illustrated in FIG. 2, the geographical area is subdivided into illustrative cells 401-403 which are illuminated with radio frequency energy from base sites 411-413 and 441-443. Each base site 411-413 and 441-443 is coupled by data and voice lines to a radio-telephone control terminal 420 which may be similar to the terminals described in aforementioned U.S. Pat. Nos. 3,906,166 and 4,268,722. These data and voice lines may be provided by dedicated wire lines, pulse code modulated carrier lines, microwave radio channels, or other suitable communication links. Control terminal 420 is, in turn, coupled to the existing telephone network via a conventional telephone central office 110 for completing telephone calls between mobiles and landline telephones. Control terminal 420 may include its own subscriber data base which includes subscriber identification and billing information or may also be coupled by data lines to a remote subscriber data base 430.

Figure 3:
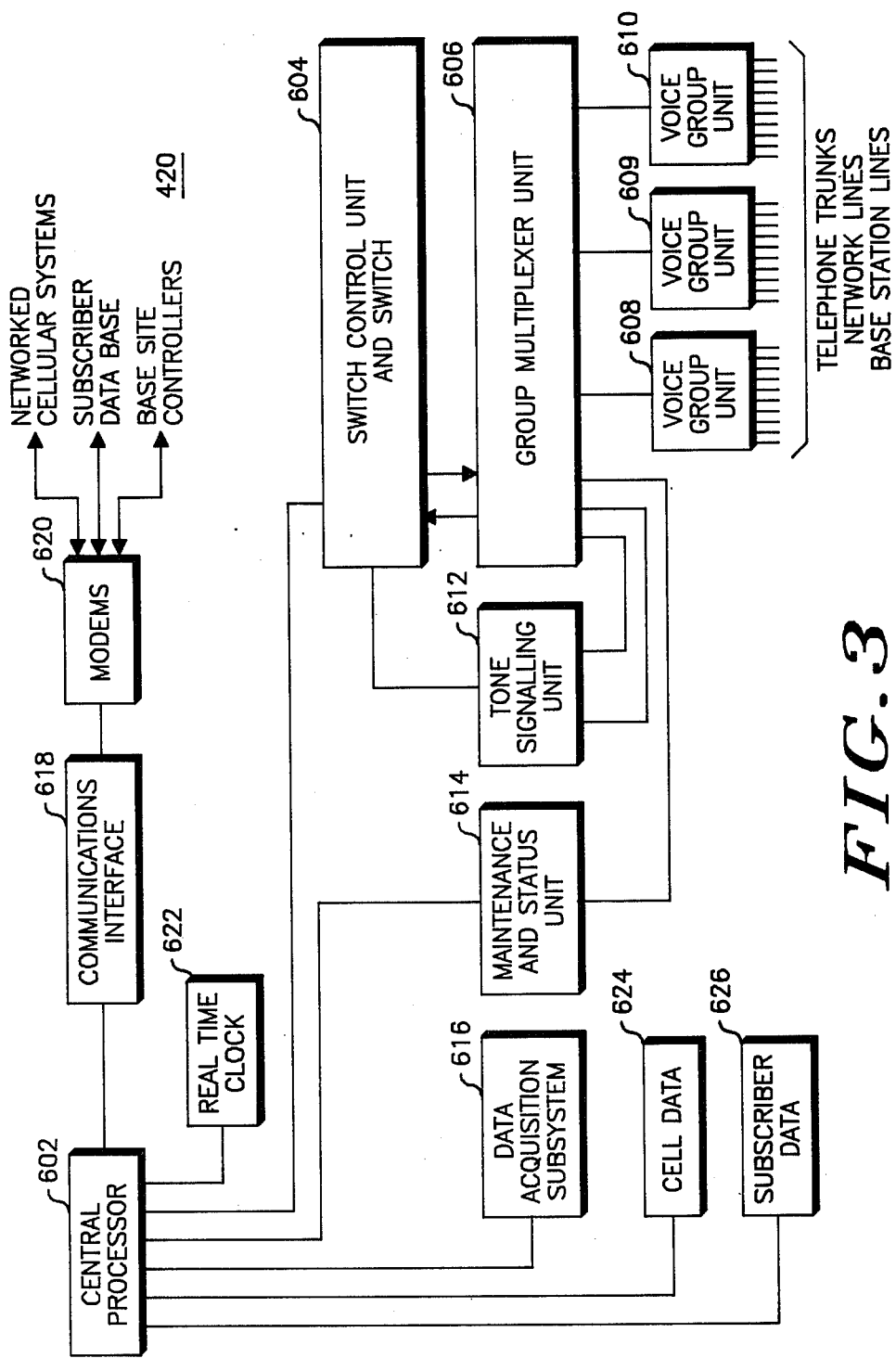
FIG. 3 is a block diagram of the control terminal in FIG. 2.

A functional block diagram of a typical control terminal 420 is shown in FIG. 3. This control terminal may be an EMX 100 available from Motorola, Inc. or any other suitable commercially available equivalent. Basically, the control terminal consists of a central processor (CCP) 602, a switch control unit and switch 604, group multiplexer unit 606, voice group units 608-610, tone signalling unit 612, maintenance and status unit 614, data acquisition subsystem 616, communications interface 618, modems 620, real-time clock 622, cell data base 624 and subscriber data base 626. Cell data base 624 includes data identifying border cells, adjacent cells and lists of paging/access channels for directed retrys. Subscriber data base 626 includes data identifying valid subscriber identification numbers and other subscriber related information. Communications over the data lines to each base site, cellular system and remote subscriber data base may be accomplished via conventional modems 620 using any conventional communications protocol such as Advanced Data Communications Control Procedures (ADCCP).

Figure 4:
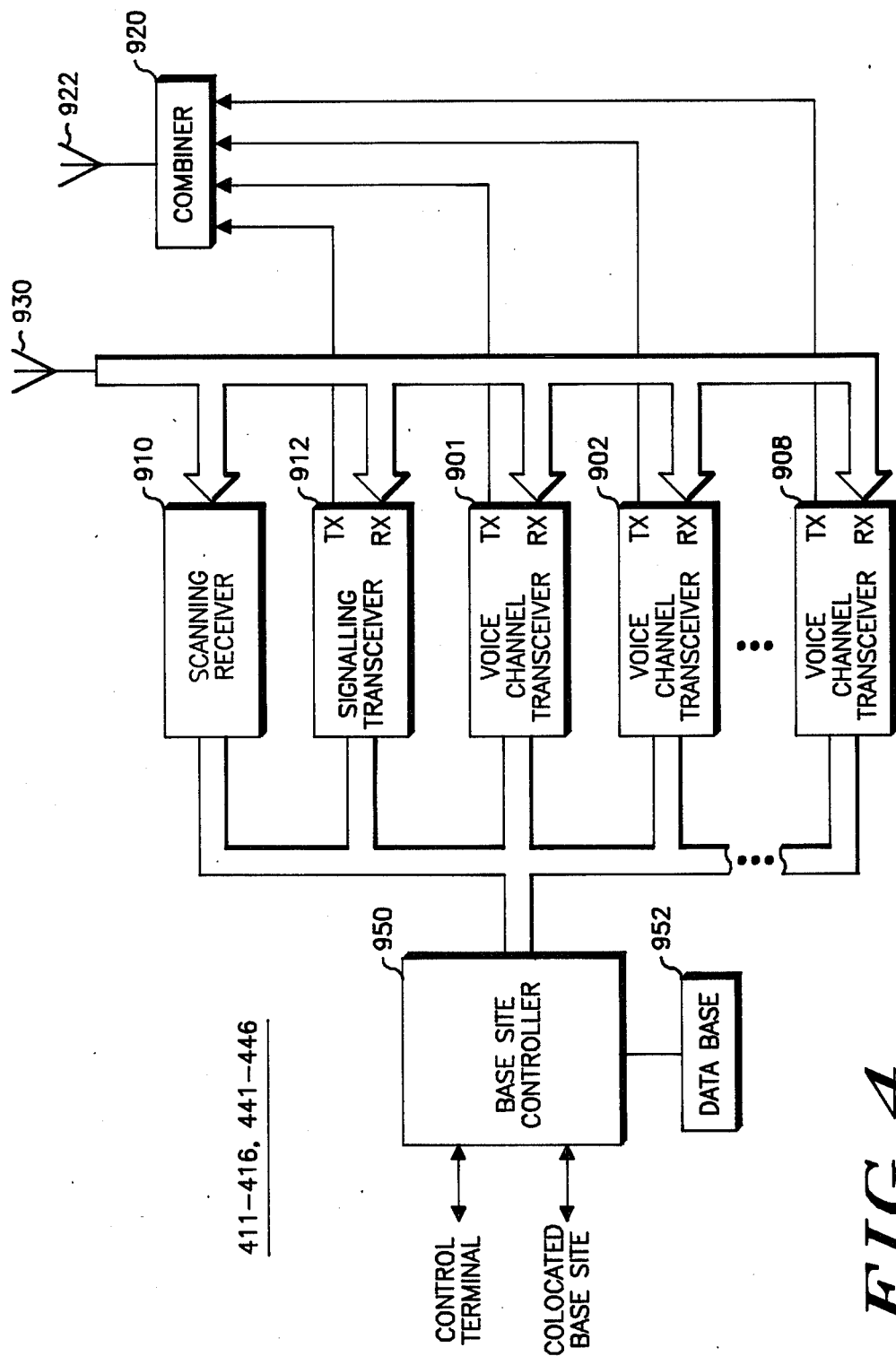
FIG. 4 is a block diagram of the base sites in FIG. 2.

The interconnection between control terminal 420 and the base sites 411-416 and 441-446 is further shown in FIG. 4. The interconnection may be on a line per channel basis or a pulse-code-modulation (PCM) group basis. Either type of interconnection is well known in the art A separate data line, such as, for example, a standard telephone line or other communications link capable of carrying high-speed data, is extended between the control terminal 420 and each base site 411-416 and 441-446.

Typical call flow scenarios togethe with related flow diagrams for control terminal 420 of cellular system 101 in FIG. 1 are shown and described in the instant assignee's copending U.S. applications Ser. No. 925,427, filed Oct. 31, 1987, entitled "Networked Cellular Radiotelephone Systems", invented by Michael Burke et al. and Ser. No. 37,268, filed Apr. 10, 1987, entitled "Registration of Radiotelephones in Networked Cellular Radiotelephone Systems", invented by James M. Williams, both incorporated herein by reference, and in Motorola Instruction Manual No. 68P81150E06, entitled "DYNATAC Call Flow", published by Motorola Service Publications, 1301 East Algonquin Road, Schaumburg, Ill., in 1983.

Referring to FIG. 4, each of the base site 411-416 and 441-446 includes a base site controller (BSC) 950, data base 952, a scanning receiver 910, a signalling transceiver 912 for operating on at least one duplex paging/access channel, a plurality of voice channel transceivers 901-908 for operating on corresponding duplex voice channels, receiving antennas 930, transmitter combiner 920, and transmitter antenna 922. BSC 950 may be coupled by data lines to its corresponding colocated BSC, if any. BSC 950 stores in data base 952 information pertaining to mobiles requesting voice channels, mobiles assigned voice channels and mobiles directed to colocated base sites.

Voice channel transceivers 901-908 in FIG. 4 may be located substantially at the center of each of the corresponding cells 401-406. The transmitters of signalling transceiver 912 and voice channel transceivers 901-908 may be combined by conventional combiner 920 onto one omni-directional antenna 922, while the signalling receiver 912 and receivers of voice channel transceivers 901-908 and scanning transceiver 910 may be selectively intercoupled to two or more directional or omni-directional antennas 930. Alternatively, in other conventional embodiments, each transmitter of signalling transceiver 912 and voice channel transceivers 901-908 may also be coupled to two or more directional antennas.

Antennas 930 in FIG. 4 may be implemented with six 60° sector antennas. Each sector antenna 930 primarily covers a portion of a cell as shown in dashed lines in FIG. 2 and typically has a coverage area that overlaps the coverage area of adjacent sector antennas. Since the paging/access channel generally requires an omnidirectional receiving pattern, the signals received by the six sector antennas 930 may be combined in signalling transceiver 912 by means of a maximal ratio predetection diversity combiner, as illustrated and described in U.S. Pat. Nos. 4,369,520 and 4,519,096 each assigned to the assignee of the present invention and incorporated herein by reference. Furthermore, signalling transceiver 912 may provide coverage of a portion of a cell by selectively combining the signals received by two or more of the sector antennas 930. The sector antennas 930 and associated receiving apparatus may be of the type shown and described in U.S. Pat. Nos. 4,101,836, 4,317,229 and 4,549,311 each assigned to the assignee of the present invention and incorporated herein by reference.

The base site equipment in FIG. 4 and its operation is described in further detail in the aforementioned patent applications Ser. Nos. 925,427 and 37,268, in U.S. Pat. No. 4,485,872, and in the instant assignee's copending patent application Ser. No. 829,872, filed Feb. 18, 1986, entitled "Method and Apparatus for Signal Strength Measurement and Antenna Selection in Cellular Radiotelephone Systems", and invented by Barry J. Menich et al., all incorporated herein by reference. Furthermore, the base site equipment illustrated in FIG. 4 is commercially available from Motorola, Inc. and employs transceivers of the type described in Motorola Instruction Manual No. 68P81060E30, published by Motorola Service Publications, 1301 East Algonquin Road, Schaumburg, Ill., in 1982.

The flow diagrams in FIGS. 6, 7, 8 and 9 provide a detailed description of the process steps executed by the corresponding processing circuitry of cellular system 101 in FIG. 1. By way of analogy to an electrical circuit diagram, these flow diagrams are equivalent to a detailed schematic for an electrical circuit where provision of the circuitry for electrical circuit blocks corresponds to provision of actual computer instructions for the flow diagram blocks. Thus, the coding of the process steps of these flow diagrams into instructions of suitable commercially available computers is a mere mechanical step for a routineer skilled in the programming art.

In summary, an improved method and apparatus has been illustrated and described for assigning voice radio channels in cellular systems having expanded radio frequency bands accessible only to some of the mobiles. According to another feature of the present invention, additional base sites may be colocated with existing base sites for accommodating additional voice channels without subdividing existing cells or adding new cells. As a result, additional radiotelephone traffic can be handled by existing base sites. Therefore, while a particular embodiment of the present invention has been shown and described, it should be understood that the present invention is not limited thereto since other embodiments may be made by those skilled in the art without departing from the true spirit and scope of the present invention. It is thus contemplated that the present invention encompasses any and all such embodiments covered by the following claims.

We claim:

1. A method of assigning voice radio channels for radiotelephone calls in a cellular radiotelephone system providing telephone service to radiotelephones located in a geographical area, said geographical area divided into a plurality of cells, each cell assigned at least one paging/access radio channel and a first plurality of voice radio channels which differ from those assigned to adjoining cells, and each cell including fixed site radio apparatus for communicating with said radiotelephones, said method comprising the steps of:
    assigning a second plurality of voice radio channels to at least one cell which differ from the first plurality of voice radio channels of all cells;
    operating a first group of radiotelephones on the first plurality of voice radio channels of all cells;
    operating a second group of radiotelephones on the first plurality of voice radio channels of all cells and the second plurality of voice radio channels of said one cell;
    for a radiotelephone call in each cell with a radiotelephone in the first group of radiotelephones, assigning a voice radio channel from the first plurality of voice radio channels for the cell; and
    for a radiotelephone call in said one cell with a radiotelephone in the second group of radiotelephones, assigning one of the second plurality of voice radio channels for the cell before assigning one of the first plurality of voice radio channels for the cell.

2. The method according to claim 1, wherein said one cell includes first control means coupled to first fixed site radio apparatus operating on the first plurality of voice radio channels and second control means coupled to second fixed site radio apparatus operating on the second plurality of voice radio channels, said method further including the steps of;
    at said first fixed site apparatus, receiving a request for a voice radio channel from a requesting radiotelephone; and
    at said first control means, directing said requesting radiotelephone to said second fixed site apparatus when none of the first plurality of voice radio channels are available.

3. The method according to claim 2, wherein said directing step includes the steps of sending a directed retry message to said requesting radiotelephone.

4. The method according to claim 2, further including the steps of:
    at said second fixed site apparatus, receiving a request for a voice radio channel from said requesting radiotelephone; and
    at said second control means, redirecting said requesting radiotelephone back to said first fixed site apparatus when none of the second plurality of voice radio channels are available.

5. The method according to claim 2, further including the steps of:
    at said second fixed site apparatus, receiving a request for a voice radio channel from said requesting radiotelephone; and
    at said second control means, assigning said requesting radiotelephone to an available one of the second plurality of voice radio channels.

6. The method according to claim 1, wherein said one cell includes first control means coupled to first fixed site radio apparatus operating on the first plurality of voice radio channels and second control means coupled to second fixed site radio apparatus operating on the second plurality of voice radio channels, said method further including the steps of;
    at said first fixed site apparatus, receiving a request for a voice radio channel from a requesting radiotelephone; and
    at said first control means, assigning said requesting radiotelephone to an available one of the first plurality of voice radio channels.

7. A method of assigning voice radio channels for radiotelephone calls in a cellular radiotelephone system providing telephone service to radiotelephones located in a geographical area, said geographical area divided into a plurality of cells, each cell assigned at least one paging/access radio channel and a first plurality of voice radio channels which differ from those assigned to adjoining cells, and each cell including fixed site radio apparatus for communicating with said radiotelephones, said method comprising the steps of:
    assigning a second plurality of voice radio channels to each cell of a group of cells which differ from the first plurality of voice radio channels of all cells
and from those voice radio channels assigned to
adjoining cells;

operating a first group of radiotelephones on the first
plurality of voice radio channels of all cells;

operating a second group of radiotelephones on the
first plurality of voice radio channels of all cells
and the second plurality of voice radio channels of
all cells of said group of cells;

for a radiotelephone call in each cell with a radiotelephone in the first group of radiotelephones, assigning a voice radio channel from the first plurality of voice radio channels for the cell; and for a radiotelephone call in each cell of said group of cells with a radiotelephone in the second group of radiotelephones, assigning one of the second plurality of voice radio channels for the cell before assigning one of the first plurality of voice radio channels for the cell.

8. The method according to claim 7, further including the step of, for each cell, substantially colocating first control means coupled to first fixed site radio apparatus operating on the first plurality of voice radio channels with second control means coupled to second fixed site radio apparatus operating on the second plurality of voice radio channels.

9. A radiotelephone system coupled to a central office for providing telephone service to radiotelephones located in a geographical area, said geographical area divided into a plurality of cells, each cell assigned at least one paging/access radio channel and a first plurality of voice radio channels which differ from those assigned to adjoining cells, and at least one cell assigned a second plurality of voice radio channels which differ from the first plurality of voice radio channels of all cells, said radiotelephone system including:

a first group of radiotelephones operating on the first plurality of voice radio channels of all cells;

a second group of radiotelephones operating on the first plurality of voice radio channels of all cells and the second plurality of voice radio channels of said one cell;

a plurality of in trunks and a plurality of out trunks coupled to the central office;

a plurality of fixed site radio apparatus each located in a corresponding cell and operating on the paging/access radio channel and the first plurality of voice radio channels for the cell in which it is located for communicating with said first group of radiotelephones and said second group of radiotelephones; and additional fixed site radio apparatus located in said one cell and operating on the second plurality of voice radio channels for communicating with said second group of radiotelephones.

10. A radiotelephone system coupled to a central office for providing telephone service to radiotelephones located in a geographical area, said geographical area divided into a plurality of cells, each cell assigned at least one paging/access radio channel and a first plurality of voice radio channels which differ from those assigned to adjoining cells, and a group of cells each assigned a second plurality of voice radio channels which differ from the first plurality of voice radio channels for all cells and from those voice radio channels assigned to adjoining cells, said radiotelephone system including:

a first group of radiotelephones operating on the first plurality of voice radio channels of all cells;

a second group of radiotelephones operating on the first plurality of voice radio channels of all cells and the second plurality of voice radio channels of all cells of said group of cells;

a plurality of in trunks and a plurality of out trunks coupled to the central office;

a plurality of fixed site radio apparatus each located in a corresponding cell and operating on the paging/access radio channel and the first plurality of voice radio channels for the cell in which it is located for communicating with said first group of radiotelephones and said second group of radiotelephones; and a plurality of additional fixed site radio apparatus each located in a corresponding cell of said group of cells and operating on the second plurality of voice radio channels for communicating with said second group of radiotelephones.

11. A method of controlling fixed site apparatus in at least one cell of a cellular radiotelephone system providing telephone service to radiotelephones located in a geographical area, said geographical area divided into a plurality of cells, each cell assigned at least one paging/access radio channel and a plurality of voice radio channels which differ from those assigned to adjoining cells, each cell including fixed site radio apparatus for communicating with said radiotelephones, and said radiotelephones requesting a voice radio channel for a telephone call on the paging/access radio channels of the cells, said method comprising the steps of:

colocating, in said at least one cell, first fixed site radio apparatus operating on a paging/access radio channel and a first plurality of voice radio channels and second fixed site radio apparatus operating on a paging/access radio channel and a second plurality of voice radio channels;

at said first fixed site apparatus, receiving on the paging/access radio channel a request for a voice radio channel from a requesting radiotelephone; and at said first fixed site apparatus, directing said requesting radiotelephone to the paging/access radio channel of said second fixed site apparatus on the basis of pre-selected criteria.

12. The method according to claim 11, wherein said directing step directs said requesting radiotelephone to said second fixed site apparatus when none of the first plurality of voice radio channels are available.

13. The method according to claim 11, wherein said directing step includes the steps of sending a directed retry message to said requesting radiotelephone.

14. The method according to claim 11, further including the step of, at said second fixed site apparatus redirecting said requesting radiotelephone back to said first fixed site apparatus when none of the second plurality of voice radio channels are available.

15. A method of controlling fixed site apparatus in at least one cell of a cellular radiotelephone system providing telephone service to radiotelephones located in a geographical area, said geographical area divided into a plurality of cells, each cell assigned at least one paging/access radio channel and a plurality of voice radio channels which differ from those assigned to adjoining cells, each cell including fixed site radio apparatus for communicating with said radiotelephones, and said radiotelephones requesting a voice radio channel for a telephone call on the paging/access radio channels of the cells, said method comprising the steps of:

locating, in said at least one cell, first fixed site radio apparatus operating on a paging/access radio channel and a first plurality of voice radio channels and second fixed site radio apparatus operating on an access-only radio channel and a second plurality of voice radio channels;

at said first fixed site apparatus, receiving on the paging/access radio channel a request for a voice radio channel from a requesting radiotelephone; and at said first fixed site apparatus, directing said requesting radiotelephone to the access-only radio channel of said second fixed site apparatus on the basis of pre-selected criteria.

16. The method according to claim 15, wherein said directing step directs said requesting radiotelephone to said second fixed site apparatus when none of the first plurality of voice radio channels are available.

17. The method according to claim 15, wherein said directing step includes the steps of sending a directed retry message to said requesting radiotelephone.

18. The method according to claim 15, further including the step of, at said second fixed site apparatus, redirecting said requesting radiotelephone back to said first fixed site apparatus when none of the second plurality of voice radio channels are available.

19. The method according to claim 15, further including the step of storing information identifying said requesting radiotelephone when said requesting radiotelephone is directed to the access-only radio channel of said second fixed site apparatus.

20. The method according to claim 19, wherein said directing step includes the steps of:

comparing requesting mobile information to said stored information to determine if said requesting mobile was previously directed to the access-only radio channel of said second fixed site apparatus; and assigning an available one of the first plurality of voice radio channels to said requesting mobile if it was previously directed to the access-only radio channel of said second fixed site apparatus.

21. The method according to claim 20, further including the step of directing said requesting mobile to fixed site apparatus of an adjacent cell if none of the first plurality of voice radio channels is available and said requesting mobile was previously directed to the access-only radio channel of said second fixed site apparatus.

22. The method according to claim 11, further including the step of storing information identifying said requesting radiotelephone when said requesting radiotelephone is directed to the paging/access radio channel of said second fixed site apparatus.

23. The method according to claim 22, wherein said directing step includes the steps of:

comparing requesting mobile information to said stored information to determine if said requesting mobile was previously directed to the paging/access radio channel of said second fixed site apparatus; and assigning an available one of the first plurality of voice radio channels to said requesting mobile if it was previously directed to the paging/access radio channel of said second fixed site apparatus.

24. The method according to claim 23, further including the step of directing said requesting mobile to fixed site apparatus of an adjacent cell if none of the first plurality of voice radio channels is available and said requesting mobile was previously directed to the paging/access radio channel of said second fixed site apparatus.

* * * * *